US011484385B2

(12) United States Patent
Berry

(10) Patent No.: US 11,484,385 B2
(45) Date of Patent: Nov. 1, 2022

(54) POSITIONING ASSEMBLY FOR CONTROL WHIP OF DENTAL DELIVERY UNIT

(71) Applicant: A-dec, Inc., Newberg, OR (US)

(72) Inventor: Patrick W. Berry, Vancouver, WA (US)

(73) Assignee: A-dec, Inc., Newberg, OR (US)

( * ) Notice: Subject to any disclaimer, the term of this patent is extended or adjusted under 35 U.S.C. 154(b) by 868 days.

(21) Appl. No.: 16/387,278

(22) Filed: Apr. 17, 2019

(65) Prior Publication Data

US 2020/0330183 A1     Oct. 22, 2020

(51) Int. Cl.
*A61C 1/00* (2006.01)
*A61G 15/16* (2006.01)
*A61C 17/02* (2006.01)

(52) U.S. Cl.
CPC ............ *A61C 1/0061* (2013.01); *A61G 15/16* (2013.01); *A61C 17/02* (2013.01)

(58) Field of Classification Search
CPC ....... A61C 1/0061; A61C 19/00; A61C 19/02; A61G 15/16; F16L 3/01; F16L 3/02; F16L 3/205; F16L 3/2053
USPC .............................................. 312/209; 433/77
See application file for complete search history.

(56) References Cited

U.S. PATENT DOCUMENTS

| 5,297,961 | A | * | 3/1994 | Hanson | .................. | A61G 15/16 |
| | | | | | | 433/77 |
| 5,328,209 | A | * | 7/1994 | Cromwell | ............... | F16L 27/02 |
| | | | | | | 285/283 |
| 5,334,018 | A | * | 8/1994 | Young | .................... | A61G 15/16 |
| | | | | | | 433/77 |
| D605,772 | S | | 12/2009 | Staufenberg et al. | | |
| 9,121,542 | B2 | * | 9/2015 | Odaka | .................... | F16M 13/02 |

FOREIGN PATENT DOCUMENTS

| DE | 102006051497 A1 | * | 5/2008 | ............. A61G 15/16 |
| DE | 102008023842 A1 | | 11/2009 | |

OTHER PUBLICATIONS

"Dental Delivery Systems," *Midmark Corporation*, 2pp (2018).

(Continued)

*Primary Examiner* — Nicholas D Lucchesi
(74) *Attorney, Agent, or Firm* — Klarquist Sparkman, LLP

(57) ABSTRACT

A conduit guide includes a main body having a first portion and a second portion, the first portion being configured for attachment to a dental delivery unit, the main body defining a channel along at least a portion of its length configured to receive a utility conduit. A positioning assembly is disposed within the main body, and includes a first attachment member, a second attachment member, a biasing member, and an adjustment member. The biasing member is coupled to the first attachment member and to the second attachment member, and extends between the first attachment member and the second attachment member. The adjustment member is coupled to the biasing member and configured to axially move the biasing member to adjust a position of the conduit guide. The conduit guide is configured such that at least the adjustment member of the positioning assembly can be selectively accessed and enclosed within the main body.

17 Claims, 9 Drawing Sheets

(56) References Cited

OTHER PUBLICATIONS

Airel Quetin, "Unit Fouets," https://pdf.medicalexpo.com/pdf/airel-quetin/more-versatile-definitly/71262-212855.html, p. 8 (Nov. 2015).
Airel Quetin, "Whip-Arm Hose Instrument Holder," https://pdf.medicalexpo.com/pdf/airel-quetin/scrl-hs-heights/71262-212857.html#open857609, p. 7 (Nov. 2015).
Airel Quetin, "Unit Fouets," https://pdf.medicalexpo.com/pdf/airel-quetin/pacific/71262-166486.html, p. 8 (downloaded Nov. 3, 2021).
Anthos, "Classe L9. L6," https://pdf.medicalexpo.com/pdf/anthos/19-16/71322-230532.html, pp. 3, 30, and 33 (downloaded Nov. 2, 2021).
KaVo, "KaVo Estetica™ E50 Life," https://www.kavo.com/dental-practice-equipment/estetica-e50-life-dental-chairs#docs, pp. 6, 10, and 19 (May 2019).
Planmeca, "Planmeca Carrousel i5 element," https://henryscheinequipment.com.au/treatment-units/planmeca/compact-i5/#iLightbox[image_carousel_1]/2, (downloaded Nov. 2, 2021).
Planmeca, "Planmeca Compact™ i3 Technical Specifications," https://materialbank.planmeca.com/catalog/Brochures/r/291/viewmode=previewview/fc=4%3A92, p. 34 (downloaded Nov. 2, 2021).
Sirona, "CS—The whip arm design," https://assets.dentsplysirona.com/flagship/en/products/treatment-centers/intego/pdfs/A9110-M41-C100-01-7600.pdf, p. 3 (downloaded Nov. 2, 2021).
Sirona, "Sinius CS—With whip arm,", https://www.dentsplysirona.com/en-au/categories/treatment-centers/sinius/equipment-options.html, (downloaded Nov. 2, 2021).
International Search Report and Written Opinion from PCT Application No. PCT/US2020/028537, dated Aug. 4, 2020 (10 pages).

\* cited by examiner

POSITIONING ASSEMBLY FOR CONTROL WHIP OF DENTAL DELIVERY UNIT

FIELD

The present disclosure pertains to assemblies for adjusting the angle of whip assemblies on delivery systems for dental operatories.

BACKGROUND

Dental operatory setups typically include control heads or dental delivery units for supplying utilities such as compressed air, water, electrical power, etc., to dental instruments by way of conduits. Such delivery units typically include a housing to which a plurality of conduits may be coupled to interconnect various dental instruments with the delivery unit. Such delivery units may be in the "traditional" style, in which conduits extend from the delivery unit without a guide, or a "continental" style, in which conduit guides known as "whips" extend from the delivery unit, and may be configured to flex to aid in positioning the conduits when the instruments are removed from their holding areas for use in treating a patient. When the dental practitioner is finished using an instrument and places it back in its holding area, the corresponding whip returns to its original, generally unflexed position, keeping the associated conduit out of the way and in an orderly arrangement. Due to variability in the components used to manufacture the whips, it can be difficult to achieve and maintain uniformity in angle and positioning of multiple whips on continental style delivery units when the instruments connected to the conduits are not in use and are placed in their respective holding areas. Accordingly, there exists a need for improvements to delivery units for dental operatories.

SUMMARY

Certain embodiments of the disclosure pertain to positioning assemblies for whip arms, whip members, or conduit guides for dental delivery units. In a representative embodiment, a conduit guide comprises a main body including a first portion and a second portion, the first portion being configured for attachment to a dental delivery unit, the main body defining a channel along at least a portion of its length configured to receive a utility conduit. A positioning assembly is disposed within the main body, the positioning assembly including a first attachment member, a second attachment member, a biasing member, and an adjustment member. The biasing member is coupled to the first attachment member and to the second attachment member, and extends between the first attachment member and the second attachment member. The adjustment member is coupled to the biasing member and configured to axially move the biasing member to adjust a position of the conduit guide when the conduit guide is mounted to a dental delivery unit. The conduit guide is configured such that at least the adjustment member of the positioning assembly can be selectively accessed and enclosed within the main body.

In any or all of the disclosed embodiments, the second portion of the main body is axially movable relative to the first portion of the main body to access and enclose the adjustment member.

In any or all of the disclosed embodiments, the positioning assembly is configured to adjust a position of the second portion of the main body relative to the first portion.

In any or all of the disclosed embodiments, the positioning assembly is configured to adjust a position of the second portion of the main body by moving the second attachment member relative to the first attachment member.

In any or all of the disclosed embodiments, the main body comprises a flexible portion, and the positioning assembly is configured to flex the flexible portion to adjust the position of the second portion.

In any or all of the disclosed embodiments, the biasing member is a first biasing member, and the positioning assembly further comprises a second biasing member spaced apart from the first biasing member across a width of the main body.

In any or all of the disclosed embodiments, the positioning assembly is configured such that axially moving the first biasing member relative to the second biasing member moves the second portion of the conduit guide about a first axis, and moving the first biasing member and the second biasing member downwardly, or moving the first biasing member and the second biasing member upwardly, moves the second portion of the conduit guide about a second axis perpendicular to the first axis.

In any or all of the disclosed embodiments, the first biasing member and the second biasing member are configured as tension coil springs.

In any or all of the disclosed embodiments, the first attachment member comprises a first mounting portion and a second mounting portion, the second mounting portion being axially spaced apart from the first mounting portion, the first and second mounting portions being configured to receive the biasing member. The adjustment member is disposed between the first and second mounting portions.

In any or all of the disclosed embodiments, the second attachment member comprises a third mounting portion configured to receive the biasing member such that the biasing member extends between the second mounting portion of the first attachment member to the third mounting portion of the second attachment member.

In any or all of the disclosed embodiments, the biasing member is configured as a tension coil spring, and the tension coil spring comprises a first pin member coupled at one end of the tension coil spring and a second pin member coupled at the opposite end of the tension coil spring. The first pin member is received between the first mounting portion and the second mounting portion of the first attachment member.

In any or all of the disclosed embodiments, the first pin member is configured to extend through the adjustment member and engage the adjustment member such that rotation of the adjustment member causes longitudinal motion of the pin member relative to the first attachment member, thereby axially moving the tension coil spring.

In another representative embodiment, a dental delivery unit is configured to provide one or more utilities for performing dental procedures on a patient, and the dental delivery unit comprises a conduit guide configured according to any of the disclosed embodiments.

In another representative embodiment, a dental chair assembly comprises a chair, and a dental unit coupled to the chair, the dental unit comprising a dental delivery unit configured according to any of the disclosed embodiments.

In another representative embodiment, an assembly comprises a delivery unit configured to deliver utilities to dental instruments, and a conduit guide coupled to the delivery unit and extending outwardly therefrom. The conduit guide comprises a main body and a positioning assembly disposed within the main body, the positioning assembly including a first attachment member, a second attachment member, a biasing member, and an adjustment member, the biasing member being coupled to the first attachment member and to the second attachment member, and extending between the first attachment member and the second attachment member. The adjustment member is coupled to the biasing member and configured to axially move the biasing member to adjust a position of the conduit guide. The conduit guide is configured such that at least the adjustment member of the positioning assembly can be selectively accessed and enclosed within the main body.

In any or all of the disclosed embodiments, the main body of the conduit guide comprises a first portion configured for attachment to the delivery unit, and a second portion coupled to the first portion. The positioning assembly is disposed within the main body and configured to adjust the position of the second portion of the conduit guide relative to the first portion of the conduit guide.

In any or all of the disclosed embodiments, the second portion and/or the flexible portion of the conduit guide are axially movable relative to the first portion of the conduit guide to access and enclose the adjustment member.

In any or all of the disclosed embodiments, the positioning assembly is configured to adjust a position of the second portion of the conduit guide by moving the second attachment member relative to the first attachment member.

In any or all of the disclosed embodiments, the conduit guide comprises a flexible portion, and the positioning assembly is configured to flex the flexible portion to adjust the position of the second portion.

In another representative embodiment, a method of using a conduit guide according to any of the disclosed embodiments comprises accessing the positioning assembly within the main body of the conduit guide, with the adjustment member, adjusting moving the biasing member to adjust a position of the conduit guide, and covering the positioning assembly.

In any or all of the disclosed embodiments, accessing the positioning assembly further comprises moving the second portion and/or the flexible portion of the conduit guide axially relative to the first portion of the conduit guide to uncover at least the adjustment member of the positioning assembly.

In another representative embodiment, a whip arm for a dental delivery unit comprises a whip arm member having a proximal end for coupling to the dental delivery unit, an opposite distal end, and a longitudinal axis. The whip arm includes adjustment springs arranged on opposite sides of the longitudinal axis that are individually positionally adjustable to change a position of the distal end in at least two planes.

The foregoing and other objects, features, and advantages of the disclosed technology will become more apparent from the following detailed description, which proceeds with reference to the accompanying figures.

DETAILED DESCRIPTION

The present disclosure concerns positioning assemblies for positioning conduit guides coupled to delivery units for use in dental operatories. Continental style delivery systems or delivery units typically include elongated conduit guides known as whips or whip members, which attach to the delivery unit housing and guide utility conduits extending from the housing. The positioning assemblies described herein can be integrated at least partially within the body of the guides, and can be selectively accessible to adjust the position of the conduit guides from side-to-side and/or forward and aft.

For example, certain embodiments described herein can include first and second attachment members coupled to each other, and first and second spring members laterally spaced apart and extending between the first and second attachment members. The positioning assemblies may be integrated into the bodies of the conduit guides near a center of the overall length of the guides. By axially moving or translating one or both of the spring members, and thereby moving the second or upper attachment member, the angle or lie of at least the upper portions of the conduit guides can be adjusted along multiple axes. Axial movement of the spring members can be accomplished by rotating adjustment members coupled to each spring member. The conduit guides can be configured such that at least the adjustment members can be selectively accessed and covered or stowed. This can allow a technician at the factory, and/or a user in the field, to individually and repeatedly adjust the position of conduit guides relative to each other to facilitate the use of instruments coupled to the delivery system. The positioning assemblies can also be used to promote an aesthetically pleasing appearance of the system with multiple conduit guides arranged at the same angle, or substantially the same angle, relative to the delivery system housing, at least when the instruments connected to the conduits are not in use and are placed in their respective holding areas.

Figure 1:
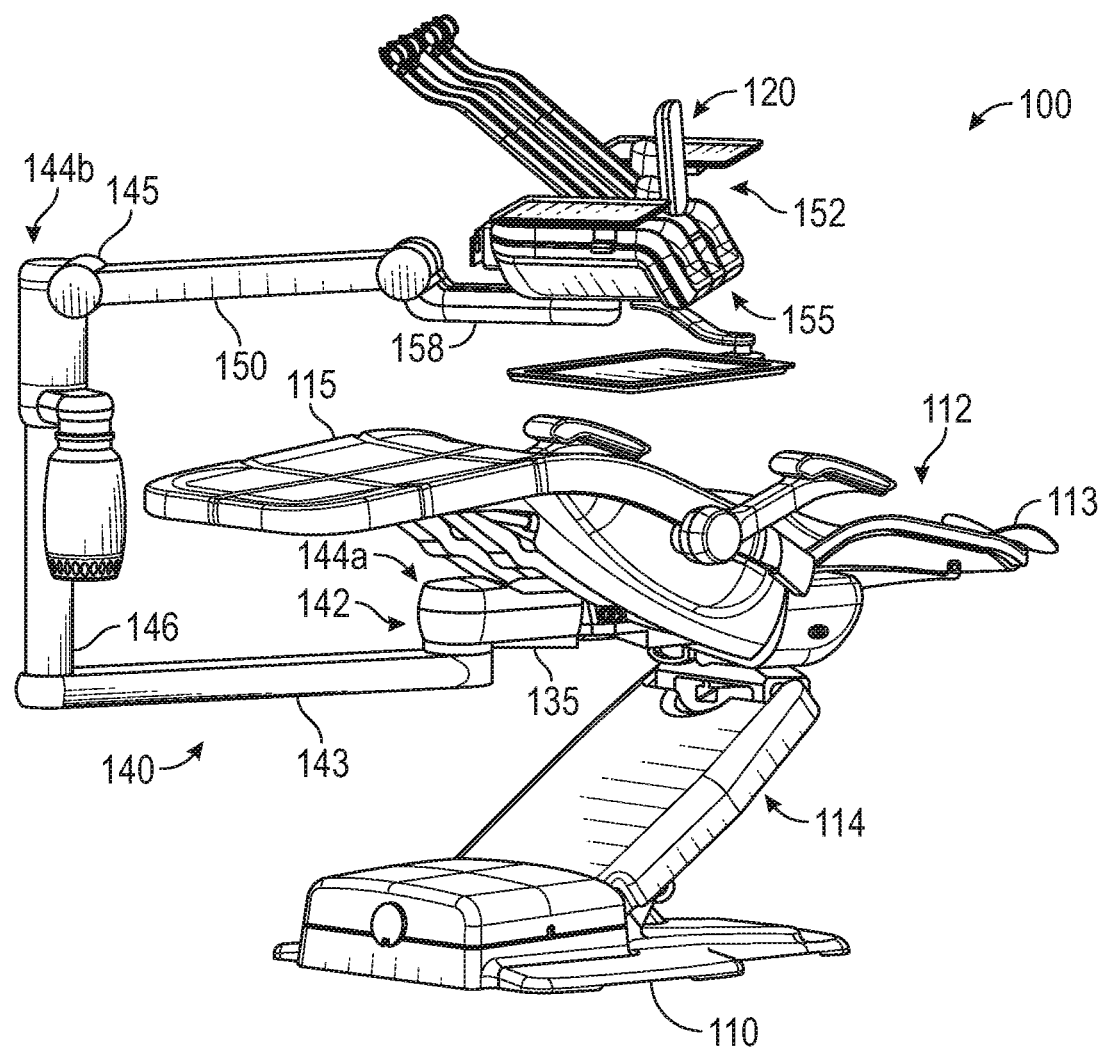
FIG. 1 is a perspective view of a dental chair assembly, according to one embodiment.

FIG. 1 is a perspective view of one example of a dental chair or treatment assembly 100 having a chair 112 and a dental unit 120, which are described below in greater detail. The chair 112 has a base 110, and a height adjustment mechanism 114 coupled to the base 110 and configured to change a height of the dental chair 112. In FIG. 1, the chair 112 is shown in a fully reclined position with an upper end (head end) having a head rest 113 at the right side of the figure, and an opposite lower end 115 at the left side of the figure. The angle of the chair 112 between the head rest 113 and the lower end 115 is fully adjustable about a hinged joint between the upper and lower sections from the fully reclined position as shown through a range of positions up to and including a fully seated position.

As used herein, the dental unit 120, sometimes referred to as the unit or the dental operative unit, refers to the device or devices that provide the necessary utilities and amenities to provide treatment to the patient (including but not limited to compressed air, water, suction, electricity, data, touch or other control for integrated devices, holders for instruments and other components, etc.). The dental unit 120 can include one or more arms, such as the dental unit arm 140 in the illustrated implementation, to support a dental delivery unit 152 (also referred to as a delivery unit, a control head, or a delivery system) and/or other equipment. The delivery unit 152 is supported by the dental unit arm 140 to provide the instruments and components of the dental unit 120 at positions convenient for treatment and is movable, e.g., to provide space for ingress and egress from the chair 112.

In the illustrated configuration, the dental unit arm 140 has a proximal end mounted to the chair 112 at a dental unit arm mount 135, which in the illustrated implementation is positioned below the lower section of the chair 112, e.g., on a lower surface thereof. The dental unit arm 140 is pivotably coupled to the dental unit arm mount 135 by a dental unit arm pivot 142. In the illustrated implementation, the dental unit arm 140 is configured to pivot in a substantially horizontal plane. The dental unit arm 140 can further comprise portions 143, 146, 150, and 158, with further degrees of freedom provided by pivots, joints, or hinges interconnecting the respective portions, such as joint 145. Although the delivery unit 152 is shown coupled to the dental unit arm 140 in the illustrated configuration, in other embodiments the delivery unit 152 can be a standalone unit that is not coupled to the chair assembly.

The delivery unit 152 can provide connections for one or more of liquid (water), compressed air, suction, electrical power, data, etc., various instruments and devices that use these connections, storage for the instruments and devices, and/or a display, among other components. The delivery unit 152 can have a handle 155 for a user to grasp with his or her hand to facilitate moving the delivery unit 152, which is frequently repositioned when performing dental procedures. The handle 155 can include an actuator, which may be mechanical, electrical, active, passive or combinations thereof. In some implementations, the handle 155 has a passive actuator to operate a positive positioning device 144*a*, a positive positioning device 144*b* and/or a brake (not shown). Further details regarding the arm 140, and control of its position using the controls of the delivery unit 152, can be found in U.S. application Ser. No. 16/035,168, which is incorporated herein by reference.

Figure 2:
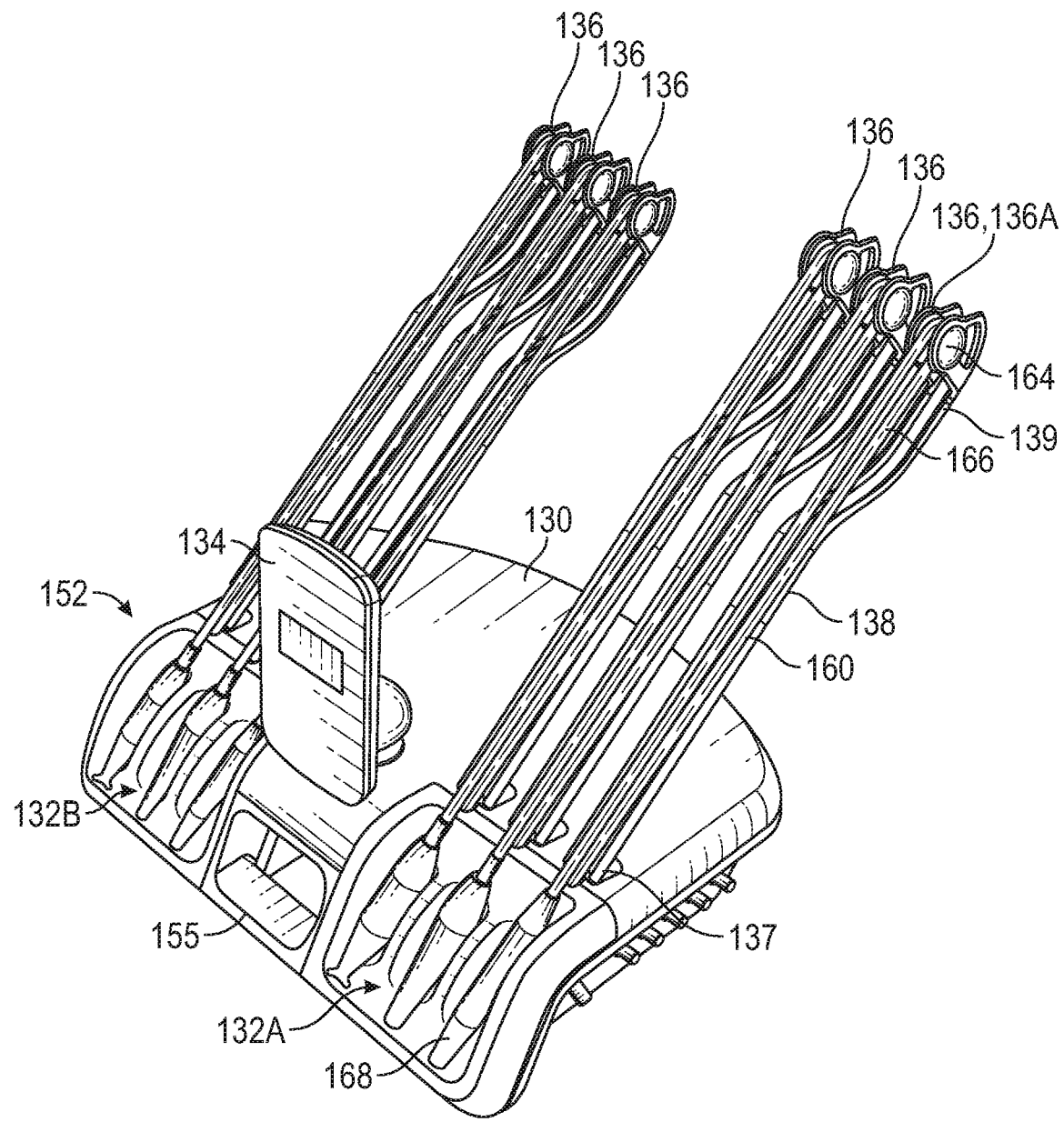
FIG. 2 is a perspective view of a dental delivery unit including a plurality of whip members, according to one embodiment.
Figure 3:
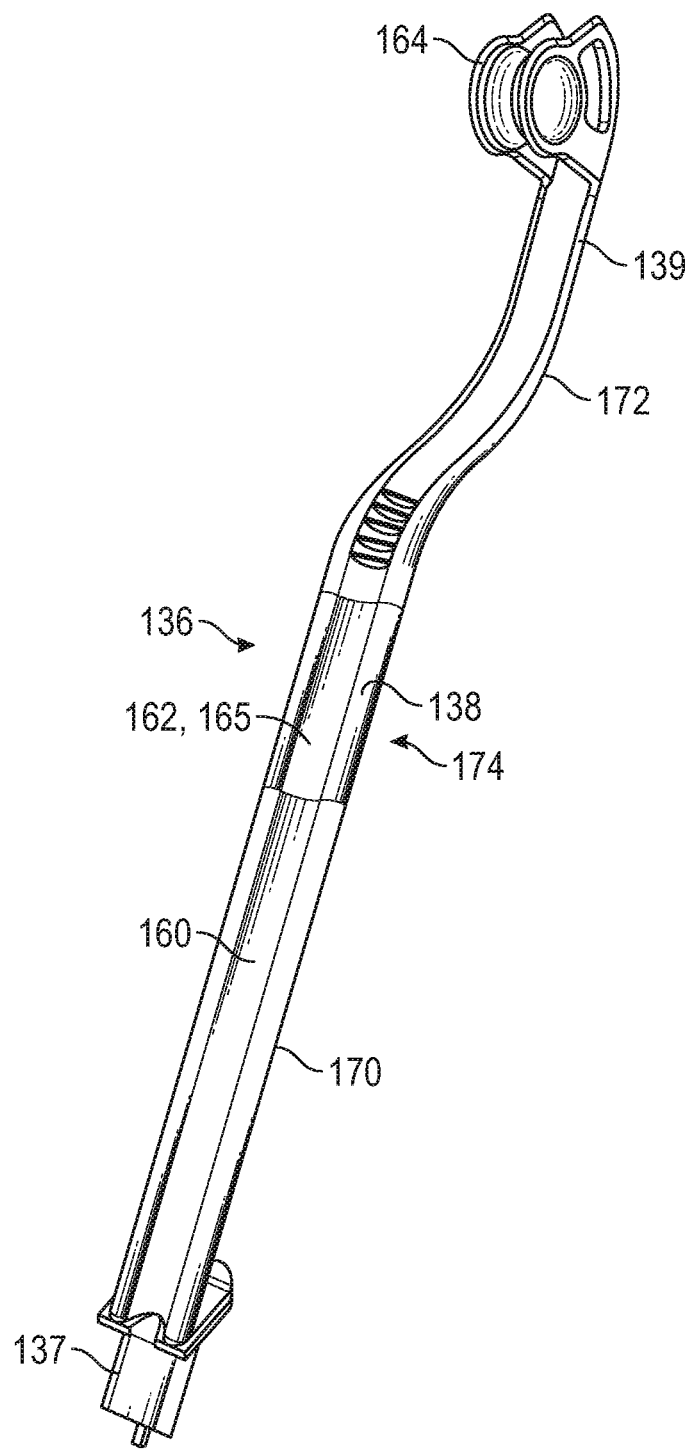
FIG. 3 is a perspective view of a representative embodiment of a whip member.

FIG. 2 illustrates the delivery unit 152 in greater detail. In the illustrated configuration, the delivery unit 152 is configured as a "continental" style delivery system including a base having a main housing or enclosure 130, two instrument holding areas 132A and 132B on opposite sides of a screen 134, and a conduit management system comprising a plurality of conduit guides configured as whip members 136 (six in the illustrated configuration). FIG. 3 shows a representative whip member 136 in isolation for purposes of illustration. The whip member 136 can comprise a main body 138 having a first end portion 137 (also referred to as a proximal end or portion) and a second end portion 139 (also referred to as a distal end or portion). As shown in FIG. 2, the first end portion 137 can be coupled to the housing 130 (e.g., attached inside the housing and extending through an opening in the top of the housing) such that the second end portion 139 is disposed above the housing 130, and with the main body 138 at an angle to the housing. The main body 138 can define a channel or recess 160 (FIG. 3) extending axially along at least a portion of the main body's length or longitudinal axis, and can comprise a flexible portion 162 located approximately in the middle of the main body 138. In the illustrated configuration, the channel 160 is defined in an exterior surface of the main body 138, although in other embodiments the channel 160 may extend at least partially within the main body. The second end portion 139 can comprise a pulley 164.

Returning to FIG. 2, and referring to a representative whip member 136A, a conduit 166 is shown extending from the housing 130, along the channel 160 of the whip member 136A, around the pulley 164, and back toward the housing. The conduit 166 can be configured to supply one or more utilities to an instrument or handpiece 168 coupled at the end of the conduit 166 and positioned in the holding area 132A.

Figure 4:
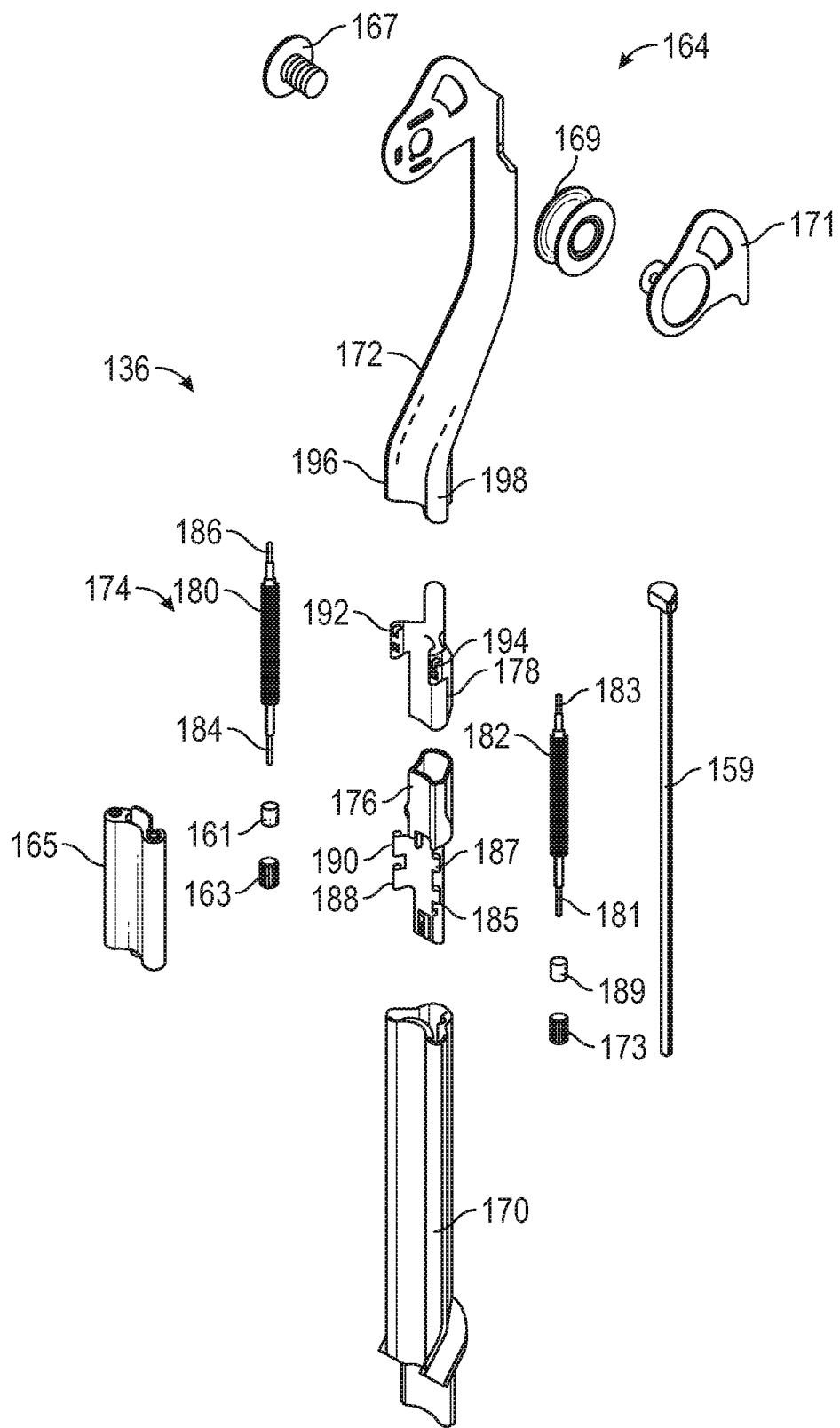
FIG. 4 is an exploded perspective view of a whip member including a positioning assembly, according to one embodiment.

In certain embodiments, the position and/or angle of the whip members 136 can be adjustable by the user in the field. To this end, the whip members 136 can comprise adjustment or positioning assemblies configured to allow a user to selectively position at least the second end portion 139 of the whip members about one or more axes. For example, FIG. 4 illustrates an exploded view of a representative embodiment of a whip member 136. The whip member 136 can comprise a first or lower member 170 (also referred to as a lower portion), a second or upper member 172 (also referred to as an upper portion), and a positioning assembly generally indicated at 174. The positioning assembly 174 can comprise a first hub, support, or attachment member 176, a second hub, support, or attachment member 178, and two biasing members configured as tension coil spring members 180 and 182. The spring members 180 and 182 can be spaced apart from each other across a width of the main body 138 on opposite sides of its longitudinal axis.

Figure 5:
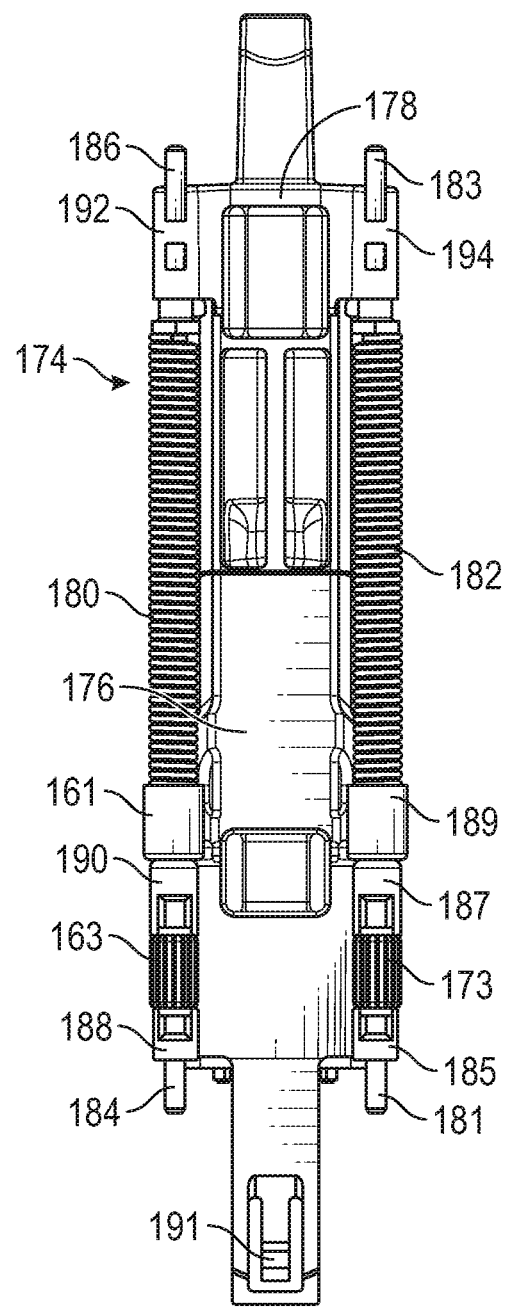
FIG. 5 is a front elevation view of the positioning assembly of FIG. 4.

The spring member 180 can comprise a first or lower mounting portion configured as a pin member 184, and a second or upper mounting portion configured as a pin member 186. Referring to FIG. 5, the lower pin member 184 can be received in corresponding mounting portions 188 and 190 on the first attachment member 176. In certain embodiments, the pin member 184 can comprise a keyed shape configured to correspond to a slot in the attachment member 176. This can prevent the spring assembly from rotating relative to the attachment member 176, while allowing motion of the spring member 180 along the pin's axis. In certain embodiments, the connections between the spring member 180 and the pin members 184 and 186 can be rigid such that rotation of the pin members relative to the spring relative can be prevented.

The mounting portions 188 and 190 can be spaced apart to accommodate a control member or adjustment member configured as a rotatable knob 163. A sleeve member 161 can be located above the mounting member 190. The second pin member 186 of the spring member 180 can be received in a corresponding mounting portion 192 of the second attachment member 178. In certain embodiments, the mounting portion 192 can be configured to prevent rotation of the pin member 186 and the spring member 180.

The second spring member 182 can be configured similarly to the first spring member 180, with pin members 181 and 183. The pin member 181 can be received in mounting portions 185 and 187 of the first attachment member 176, and the pin member 183 can be received in a mounting portion 194 of the second attachment member 178. An adjustment member 173 can be disposed on the pin member 181 between the mounting portions 185 and 187, and a sleeve member 189 can be disposed above the mounting portion 187. In some embodiments, the adjustment members 163 and 173 can comprise a gear spline finish or a knurl finish to improve frictional engagement between the members 163, 173 and an adjustment tool, and/or between the members and a user's fingers.

Figure 6:
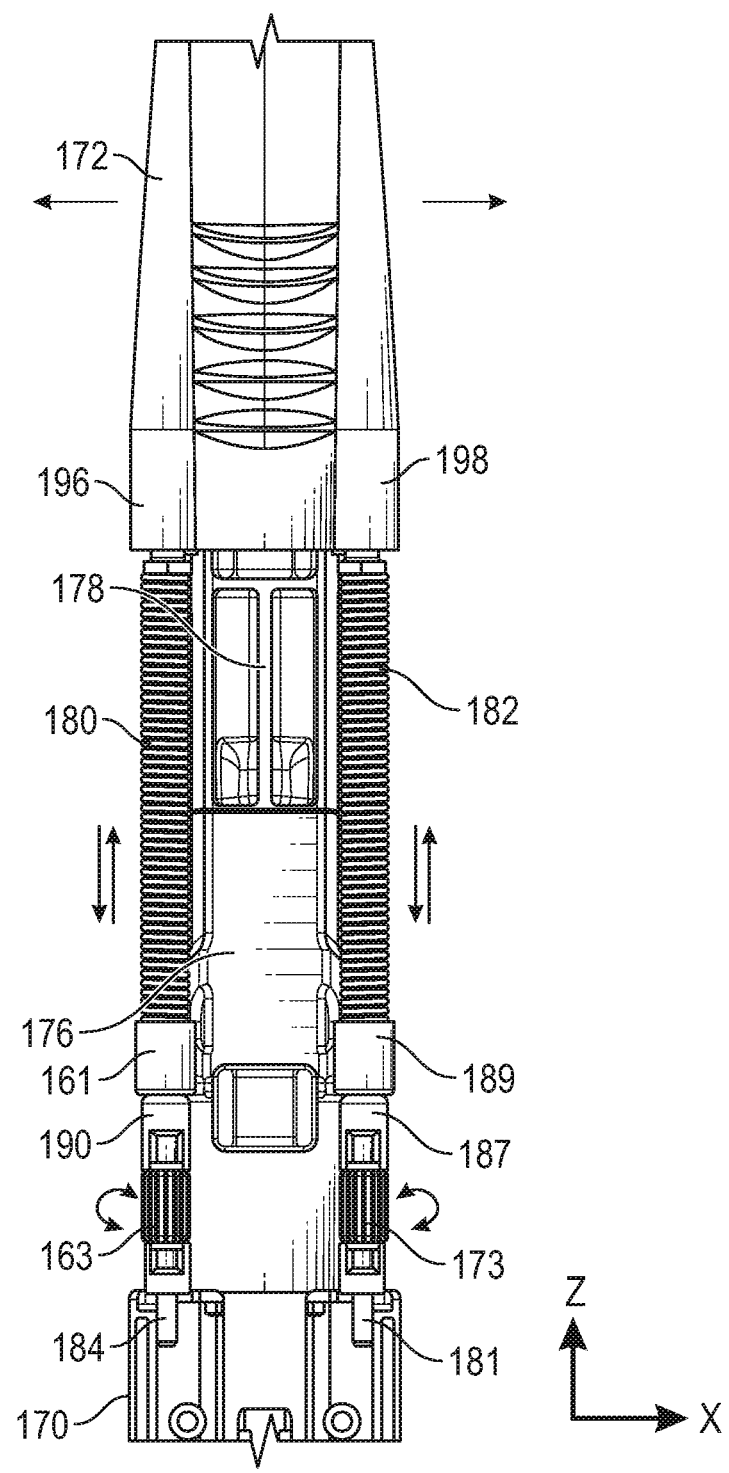
FIG. 6 is a front elevation view of a portion of a whip member including the positioning assembly of FIG. 5 with the cover removed for purposes of illustration.

Referring to FIGS. 4-6, when assembled, the attachment member 176 can be received at least partially within the lower member 170, and the attachment members 176 and 178 can be coupled together. For example, the lower portion of the member 178 can be received in an opening defined in the top portion of the member 176. In certain embodiments, the second attachment member 178 can be configured to move, pivot, and/or rotate relative to the first attachment member 176, as described further below. Referring to FIG. 5, the attachment member 176 can comprise a coupling member 191 configured to engage a corresponding lip or protrusion inside the lower member 170 to secure the positioning assembly 174 in place. The mounting portions 192 and 194 of the second attachment member 178 can be received in corresponding tubular portions 196 and 198 (FIGS. 4 and 6) of the upper member 172. A cover member 165 (FIG. 4) can at least partially enclose the positioning assembly 174. In certain embodiments, the cover member 165 can be a flexible member, and can form a part of the flexible portion 162 located between the lower member 170 and the upper member 172. More particularly, the cover member 165 can be configured to flex to allow the upper member 172 to move relative to the lower member 170. A guide or shaft 159 can extend between the lower member 170 and the upper member 172.

In the illustrated configuration, the pulley 164 can comprise a hub 167, a rotating member 169, and a cover member 171 configured to be mounted at the distal end of the second member 172. In other embodiments, the rotating member 169 can be snapped onto or attached to an axle and a cover that are part of a unitary construction including the second member 172.

Referring again to FIG. 5, the spring member 180 can extend between the pin members 184 and 186. The pin member 184 can be configured such that rotation of the adjustment member 163 moves or translates the spring member 180 axially relative to the first attachment member 176, thereby lengthening or shortening the portion of the lower pin 184 that protrudes from the mounting portion 188. For example, the pin member 184 can comprise threads engaged with corresponding threads on the inner diameter of the adjustment member 163 such that rotation of the adjustment member 163 causes corresponding longitudinal motion of the pin member 184 through the adjustment member, thereby translating the spring member 180 axially relative to the attachment member 176. Likewise, rotation of the adjustment member 173 can move the spring member 182 in a similar fashion. In certain embodiments, the first and second attachment members 176 and 178 may be movable relative to each other, for example axially, pivotably, and/or rotationally, as the spring members 180 and 182 are moved by the adjustment members 163 and 173. Thus, axially moving the spring member 180 and/or 182 can change the position or orientation of the whip member 136, the upper member 172, the second attachment member 178, and/or the flexible portion 162, relative to the base 130.

Accordingly, referring to FIG. 6, by moving the spring member 180 axially toward the housing 130 (e.g., downwardly in FIG. 6) and holding the position of the spring member 182 constant (or moving the spring member 182 upwardly), the upper member 172 can be angled, tilted, or rotated about the y-axis (extending out of the plane of the page in FIG. 6), or relative to a plane including the y-axis, to the left in FIG. 6. In certain embodiments, the attachment member 178 can pivot relative to the attachment member 176 under the influence of the spring 180. Likewise, by moving the spring member 182 downwardly and holding the spring member 180 at a constant position (and/or moving the spring member 180 upwardly), the upper member 172 can be angled or tilted to the right in FIG. 6 (e.g., by pivoting the attachment member 178 relative to the attachment member 176). In certain embodiments, the motion of the attachment member 178 relative to the attachment member 176 can allow the springs 180 and 182 to remain at a substantially constant length as they are axially moved relative to the first attachment member 176.

Figure 7:
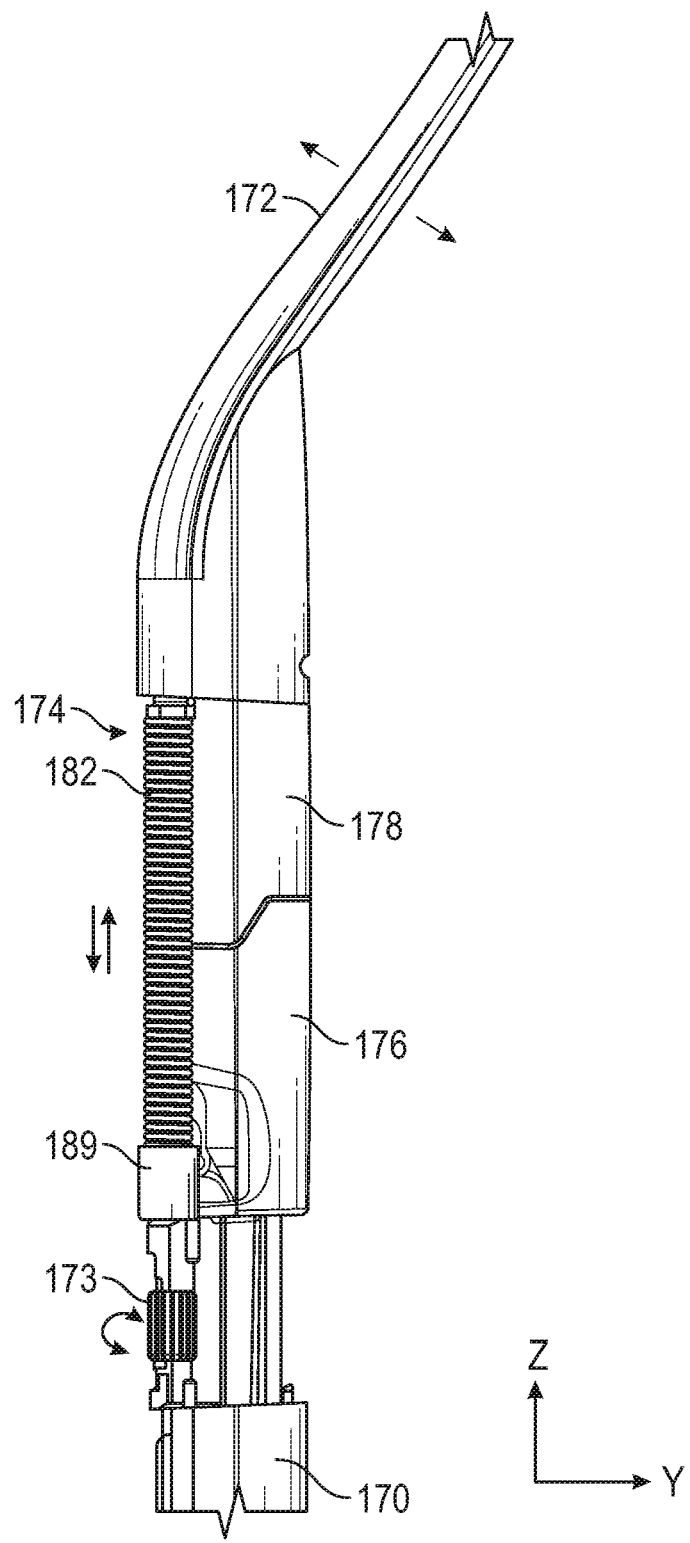
FIG. 7 is a side elevation view of a portion of a whip member including the positioning assembly of FIG. 5.

Referring to FIG. 7, by moving both springs members 180 and 182 upwardly or downwardly at the same time, at least the upper portion 172 can be angled, tilted, or rotated about the x-axis (extending out of the plane of the page in FIG. 7), or relative to a plane including the x-axis. For example, by moving both springs members 180 and 182 downwardly, the upper portion 172 can be bent forward (e.g., toward the user). By moving both spring members 180 and 182 upwardly, the upper portion 172 can be straightened, or angled backward (e.g., away from the user). The spring members 180 and 182 can also be moved independently to straighten, or achieve a desired positioning, of one whip member 136 relative to another on the delivery unit 152. In particular embodiments, the range of motion can be ±0.1 inch.

Figure 8:
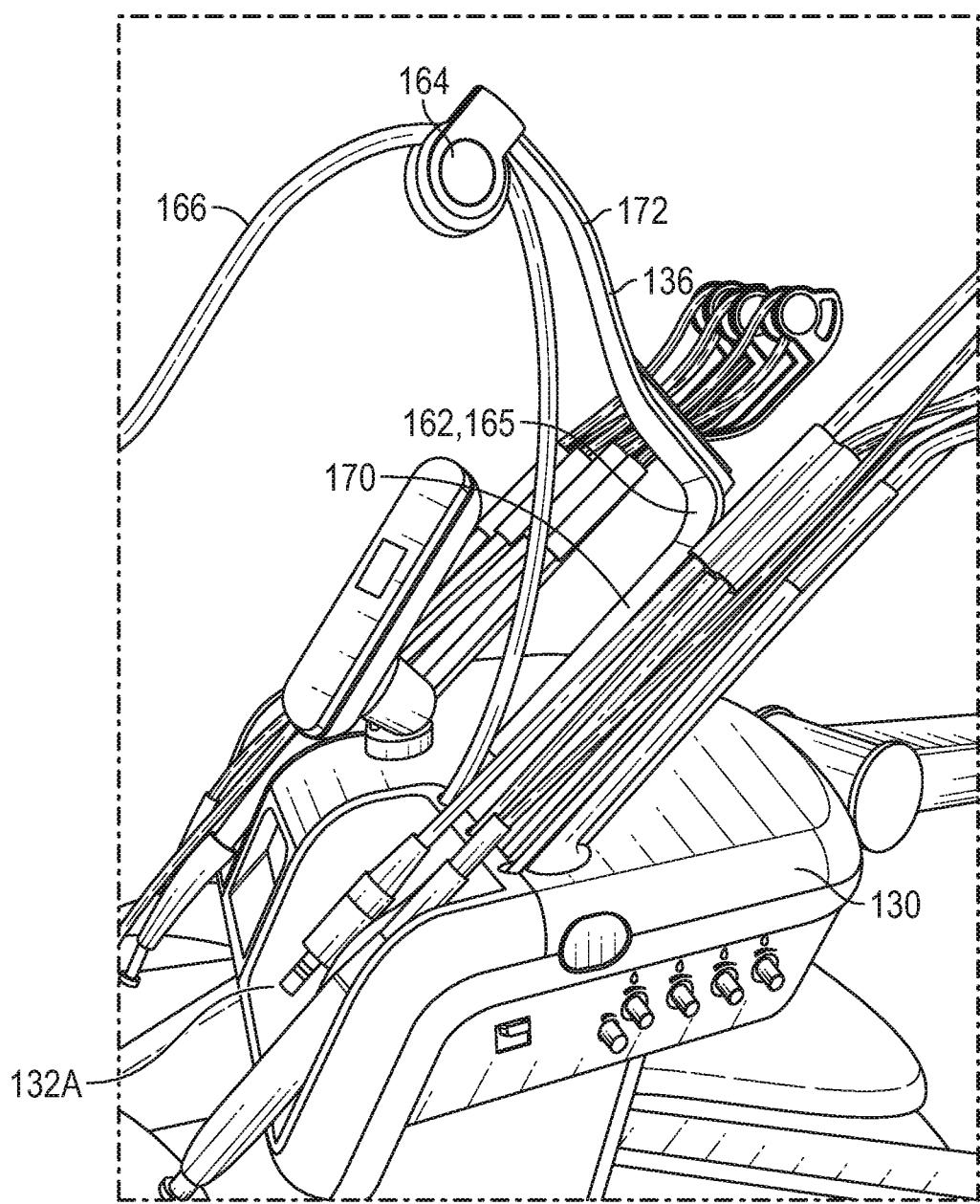
FIG. 8 is a perspective view of the dental delivery unit of FIG. 2 with a whip member shown bent forward in a use position.

Referring to FIG. 8, in certain embodiments the whip members 136 can be configured to be moved or bent forward (e.g., toward the holding areas 132A and 132B) when an instrument coupled to the particular whip member is in use. In the illustrated configuration, such motion can be effected by bending or flexing the flexible portion 162 such that the upper portion 172 moves or pivots (e.g., downwardly) relative to the lower portion 170. With the upper portion 172 pivoted toward the lower portion 170, the positioning assembly 174 can be configured to allow the upper portion 172 to move laterally, or front to back, as described above.

Figure 9:
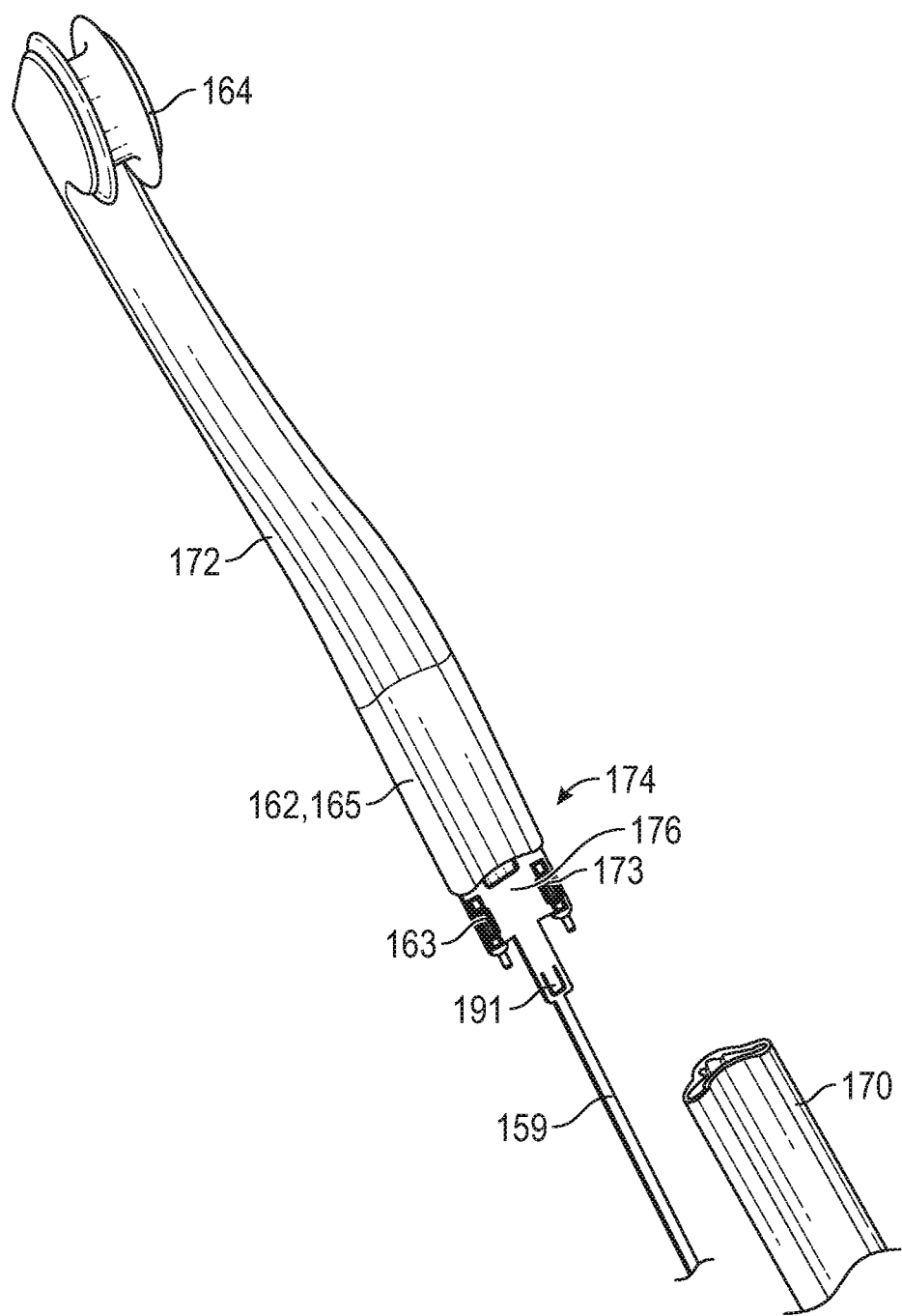
FIG. 9 is a perspective view of a whip member with the upper portion and lower portion separated to access adjustment knobs of a positioning assembly, according to one embodiment.

The whip members 136 can be configured such that at least the adjustment members 163 and 173 can be accessed by a user. For example, in certain embodiments the positioning assembly 174 can be at least partially removed from the lower portion 170 to access the adjustment members 163 and 173, as shown in FIG. 9. In certain embodiments, the upper portion 172 and/or the flexible portion 162 can be axially movable relative to the lower portion 170 such that the adjustment members 163 and 173 can be accessed by moving or pulling the upper and lower portions apart. For example, in the illustrated embodiment the coupling member 191 can be disengaged, and the upper portion 172 and/or the flexible portion 162 can be moved such that the positioning assembly 174 is removed from the lower portion 170 to access the adjustment members 163 and 173. In certain embodiments, the cover member 165 of the flexible portion 162 may move with the upper portion 172 away from the lower portion 170. When the adjustment is complete, the lower and upper portions 170, 172 can be moved, pushed, or slid back together to enclose the adjustment members within the main body of the whip member. In other embodiments, the adjustment members can be accessible by removing a removable panel from the main body of the conduit guide.

The configurations described herein can provide a number of advantages. For example, making at least the adjustment members 163 and 173 selectively accessible can allow a technician at the factory, and/or a user in the field, to adjust the position and/or angle of whip members relative to other whip members on the same delivery unit, and/or relative to the delivery unit housing, to maintain an aesthetic appearance of the system and facilitate use of instruments coupled to the system. This can also allow positional adjustment of the whip members to compensate for misalignments arising due to variability in size, tolerances, spring constants, etc., of the constituent components. By making the positioning assembly accessible, adjustments can also be made quickly and easily in the field as needed to compensate for, for example, changes in temperature and/or material properties over time. Once the adjustments are complete the adjustment members can be stowed, allowing the whip members to maintain a sleek outward appearance. The disclosed embodiments can also improve the ability to clean and disinfect the external surfaces of the whip members, while protecting the internal components from damage or deterioration by cleaning and/or disinfecting agents In other embodiments, the positioning assembly can comprise a single spring member (e.g., for forward and aft movement or side-to-side movement), or more than two spring members. In yet other embodiments, one or both of the spring members 180 and/or 182 can be configured as compression springs. In yet other embodiments, the positioning assembly 174 can comprise other types of actuators, such as linear actuators including leadscrews or translation screws, stepper motors, etc., in place of, or in combination with, the spring members 180 and 182. In still other embodiments, one or both of the adjustment members 163 and 173 can be exposed or accessible through the exterior of the whip member without requiring that the lower and upper portions 170, 172 be moved apart, or requiring that a cover be removed.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

The invention claimed is:

1. A conduit guide, comprising:
a main body including a first portion, an intermediate flexible portion and a second portion movable relative to the first portion via the flexible portion, the first portion being configured for attachment to a dental delivery unit and to extend along an inclined longitudinal axis, wherein when the conduit guide is in a rest position, the intermediate flexible portion and the second portion are aligned with the first portion along the longitudinal axis, the main body defining a channel along at least a portion of a length of the main body that is configured to receive a utility conduit; and
a positioning assembly at least partially disposed within the flexible portion of the main body, the positioning assembly including a first attachment member, a second attachment member, a biasing member, and an adjustment member, the biasing member being coupled to the first attachment member and to the second attachment member, and extending between the first attachment member and the second attachment member, the adjustment member being coupled to the biasing member and configured to axially move the biasing member to adjust a position of the second portion relative to the first portion when the conduit guide is mounted to the dental delivery unit;
wherein the conduit guide is configured such that at least the adjustment member of the positioning assembly can be selectively accessed and enclosed within the main body.

2. The conduit guide of claim 1, wherein the second portion of the main body is axially movable relative to the first portion of the main body to access and enclose the adjustment member.

3. The conduit guide of claim 1, wherein the positioning assembly is configured to adjust a position of the second portion of the main body by moving the second attachment member relative to the first attachment member.

4. The conduit guide of claim 1, wherein:
the biasing member is a first biasing member; and
the positioning assembly further comprises a second biasing member spaced apart from the first biasing member across a width of the main body.

5. The conduit guide of claim 4, wherein:
the positioning assembly is configured such that axially moving the first biasing member relative to the second biasing member moves the second portion of the conduit guide about a first axis; and
moving the first biasing member and the second biasing member downwardly, or moving the first biasing member and the second biasing member upwardly, moves the second portion of the conduit guide about a second axis perpendicular to the first axis.

6. The conduit guide of claim 5, wherein the first biasing member and the second biasing member are configured as tension coil springs.

7. The conduit guide of claim 1, wherein:
the first attachment member comprises a first mounting portion and a second mounting portion, the second mounting portion being axially spaced apart from the first mounting portion, the first and second mounting portions being configured to receive the biasing member; and
the adjustment member is disposed between the first and second mounting portions.

8. The conduit guide of claim 7, wherein the second attachment member comprises a third mounting portion configured to receive the biasing member such that the biasing member extends between the second mounting portion of the first attachment member to the third mounting portion of the second attachment member.

9. The conduit guide of claim 8, wherein:
the biasing member is configured as a tension coil spring;
the tension coil spring comprises a first pin member coupled at one end of the tension coil spring and a second pin member coupled at the opposite end of the tension coil spring; and
the first pin member is received between the first mounting portion and the second mounting portion of the first attachment member.

10. The conduit guide of claim 9, wherein the first pin member is configured to extend through the adjustment member and engage the adjustment member such that rotation of the adjustment member causes longitudinal motion of the first pin member relative to the first attachment member, thereby axially moving the tension coil spring.

11. A dental delivery unit configured to provide one or more utilities for performing dental procedures on a patient, the dental delivery unit comprising the conduit guide of claim 1.

12. A dental chair assembly, comprising:
a chair; and
a dental unit coupled to the chair, the dental unit comprising the dental delivery unit of claim 11.

13. A method of using the conduit guide of claim 1, comprising:
accessing the positioning assembly within the main body of the conduit guide;
with the adjustment member, moving the biasing member to adjust a position of the conduit guide; and
covering the positioning assembly.

14. An assembly, comprising:
a delivery unit configured to deliver utilities to dental instruments;
a conduit guide coupled to the delivery unit at a proximal end and extending outwardly therefrom to a distal end, the conduit guide comprising a main body having first portion that comprises the proximal end, a positioning assembly disposed at least partially within the main body between the proximal end and the distal end, and a second portion that comprises the distal end, the positioning assembly including a first attachment member, a second attachment member, a biasing member, and an adjustment member, the biasing member being coupled to the first attachment member and to the second attachment member, and extending between the first attachment member and the second attachment member, the adjustment member being coupled to the biasing member and configured to axially move the biasing member to adjust a position of the second portion of the conduit guide relative to the first portion of the conduit guide;
wherein the conduit guide is configured such that at least the adjustment member of the positioning assembly can be selectively accessed and enclosed within the main body.

15. The assembly of claim 14, wherein the second portion of the conduit guide is axially movable relative to the first portion of the conduit guide to access and enclose the adjustment member.

16. The assembly of claim 14, wherein the positioning assembly is configured to adjust a position of the second portion of the conduit guide by moving the second attachment member relative to the first attachment member.

17. A whip arm for a dental delivery unit, comprising:
a whip arm member having a proximal end for coupling to the dental delivery unit, an opposite distal end, and a longitudinal axis; and
adjustment springs arranged on opposite sides of the longitudinal axis and at a height above the dental delivery unit when installed that are individually positionally adjustable to change a position of the distal end in at least two planes, and
wherein the distal end is movable away from an at rest position along the longitudinal axis by applying a manual force sufficient to overcome a flexing force exerted through flexing of the adjustment springs to bend the whip arm and position the distal end in a desired working position, and wherein the whip arm is movable from the working position to the at rest position along the longitudinal axis by action of the flexing force when the manual force is relaxed.

* * * * *